(12) United States Patent
Lv et al.

(10) Patent No.: US 8,356,925 B2
(45) Date of Patent: Jan. 22, 2013

(54) LED LAMP HAVING LIGHT GUIDE

(75) Inventors: Jia-Chuan Lv, Shenzhen (CN);
Chin-Chung Chen, Taipei Hsien (TW);
Ci-Jin Mo, Shenzhen (CN)

(73) Assignees: Fu Zhun Precision Industry (Shen Zhen) Co., Ltd., Shenzhen (CN);
Foxconn Technology Co., Ltd., New Taipei (TW)

( * ) Notice: Subject to any disclaimer, the term of this patent is extended or adjusted under 35 U.S.C. 154(b) by 414 days.

(21) Appl. No.: 12/770,693

(22) Filed: Apr. 29, 2010

(65) Prior Publication Data
US 2011/0149596 A1    Jun. 23, 2011

(30) Foreign Application Priority Data

Dec. 21, 2009   (CN) .......................... 2009 1 0311910

(51) Int. Cl.
*F21V 7/04* (2006.01)
(52) U.S. Cl. ........................ 362/633; 362/632; 362/634
(58) Field of Classification Search .................. 362/612, 362/615, 623, 625, 626
See application file for complete search history.

(56) References Cited

U.S. PATENT DOCUMENTS

| | | | | |
|---|---|---|---|---|
| 2006/0176417 A1* | 8/2006 | Wu et al. | .......................... | 349/58 |
| 2007/0189040 A1* | 8/2007 | Chi et al. | ...................... | 362/620 |
| 2008/0106913 A1* | 5/2008 | Ha | ................................ | 362/618 |

* cited by examiner

*Primary Examiner* — William Carter
(74) *Attorney, Agent, or Firm* — Altis Law Group, Inc.

(57) ABSTRACT

An LED lamp includes a frame, a bracket connected to the frame, two LED modules and driving modules received between the frame and the bracket, and a backplate, a reflective plate, a light guide, a diffusion plate and a cover sequentially sandwiched between the frame and the bracket. The LED modules are oriented towards two opposite lateral sides of the light guide. The light guide has a large amount of scattering dots formed on a back face thereof. The scattering dots are arranged in multiple columns. The sizes of the dots in each column are identical to each other, and the sizes of the dots in different columns gradually increase from two opposite sides towards a middle of the light guide.

13 Claims, 9 Drawing Sheets

LED LAMP HAVING LIGHT GUIDE

BACKGROUND

1. Technical Field

The present disclosure relates to light emitting diode (LED) lamps and, more particularly, to an LED lamp having a small thickness by use of a light guide.

2. Description of Related Art

LEDs, available since the early 1960's and because of their high light-emitting efficiency, have been increasingly used in a variety of occasions, such as residential, traffic, commercial, and industrial occasions. In order to obtain a surface light emission, conventional direct-type LED lamp generally uses a diffusion plate cooperating with the spot light source, i.e., the LEDs thereof. The diffusion plate is often placed to face the LEDs, thereby to scatter the light emitted from the LEDs. By adjusting the distance between the LEDs and the diffusion plate, the light output from the lamp can be modulated to be smooth and uniform. However, the conventional lamp needs sufficient distance left between the LEDs and the diffusion plate to produce the smooth and uniform surface light emission, causing increasing in thickness and accordingly volume of the lamp. Thus, the conventional lamp cannot have a small volume.

What is needed, therefore, is an LED lamp having a light guide which can overcome the limitations described above.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
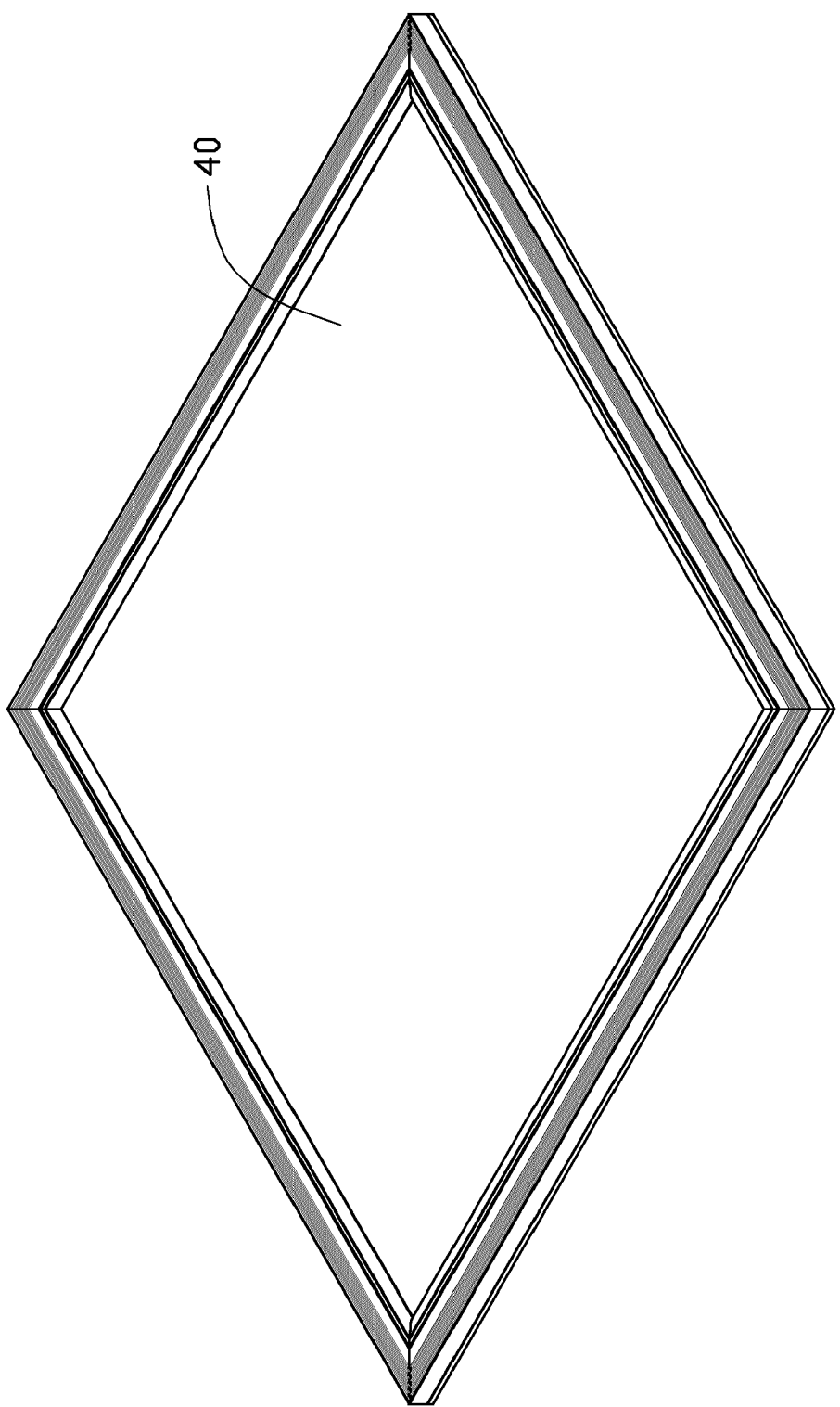
FIG. 1 is an assembled view of an LED lamp of the present disclosure.
Figure 2:
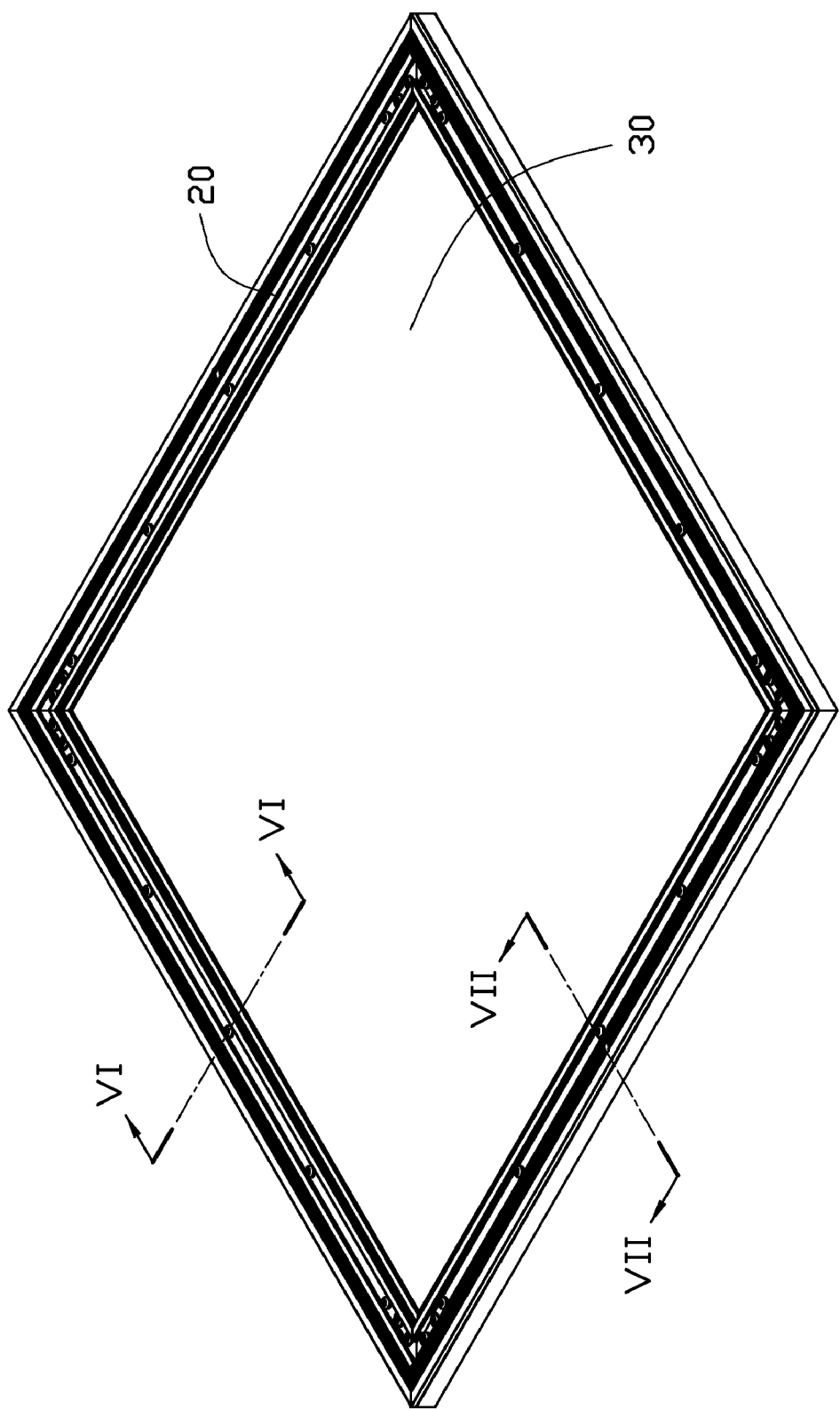
FIG. 2 is an inverted view of the LED lamp of FIG. 1
Figure 3:
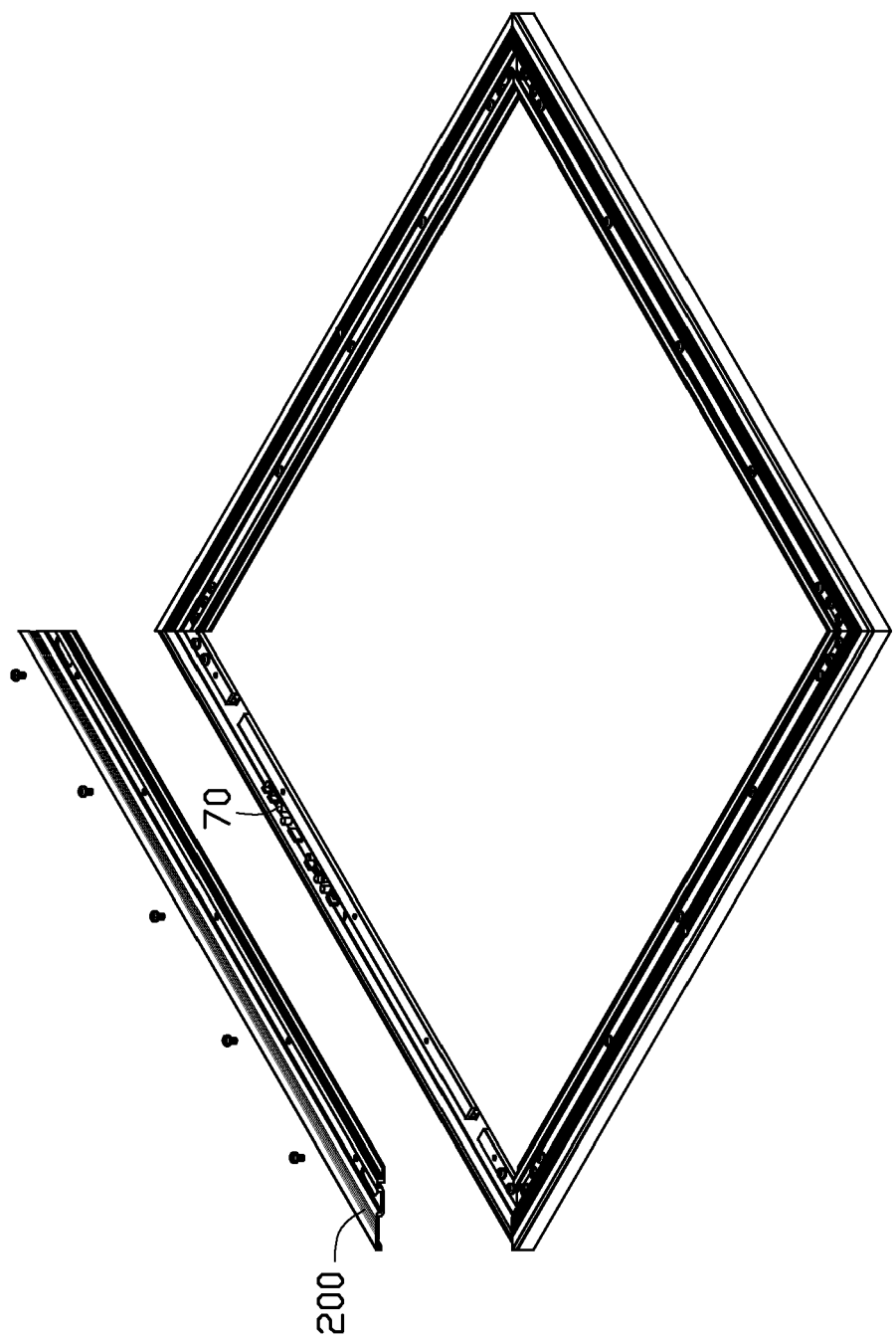
FIG. 3 is a partially exploded view of the LED lamp of FIG. 2.
Figure 4:
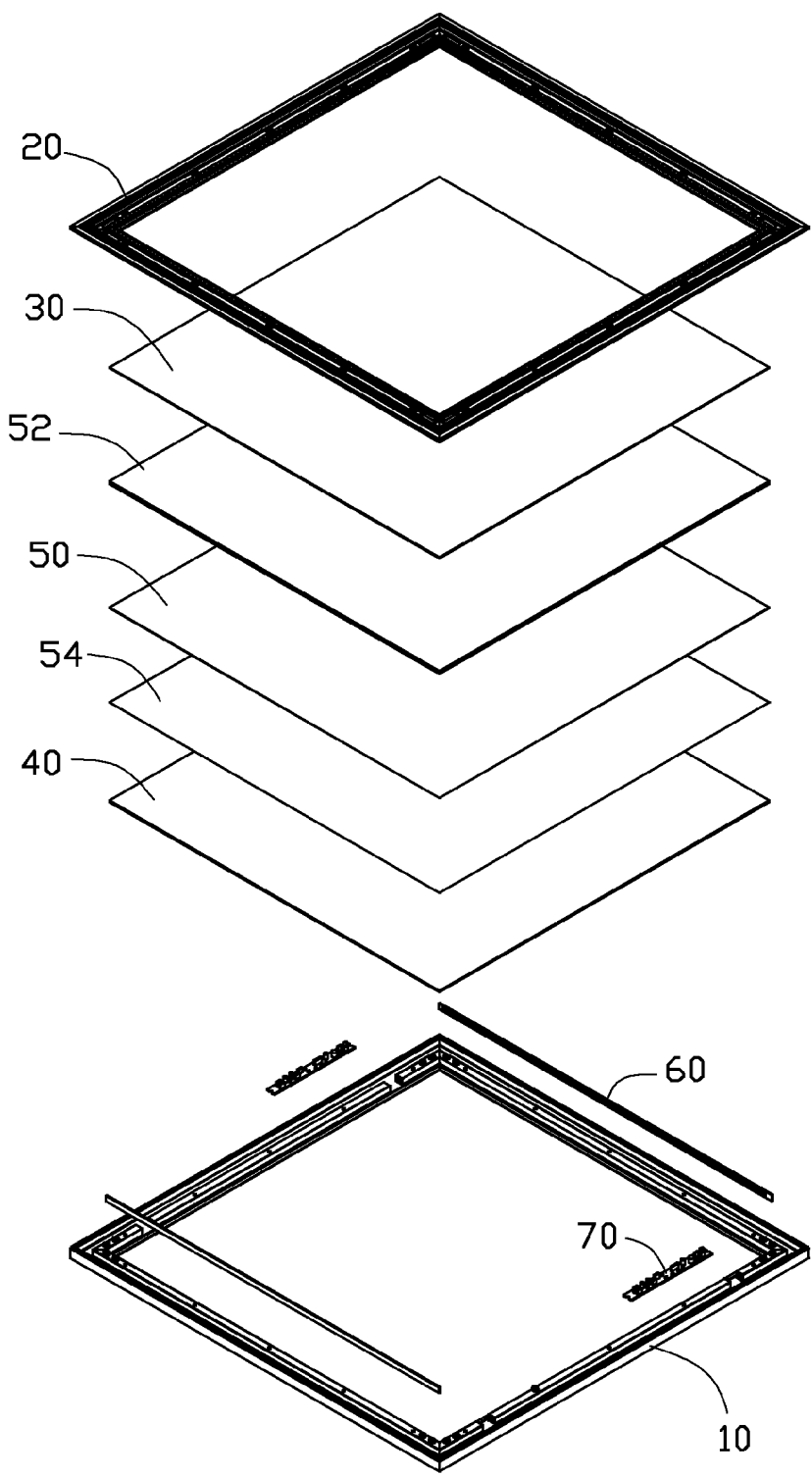
FIG. 4 is a further exploded view of the LED lamp of FIG. 3.

Referring to FIGS. 1-4, an LED lamp of the present disclosure is illustrated. The LED lamp includes a frame 10, a bracket 20 connected to the frame 10, a backplate 30 fixed in the bracket 20, a cover 40 fixed in the frame 10, a diffusion plate 54, a light guide 50 and a reflective plate 52 sandwiched between the backplate 30 and the cover 40, and two LED modules 60 and driving modules 70 received between the frame 10 and bracket 20.

Figure 5:
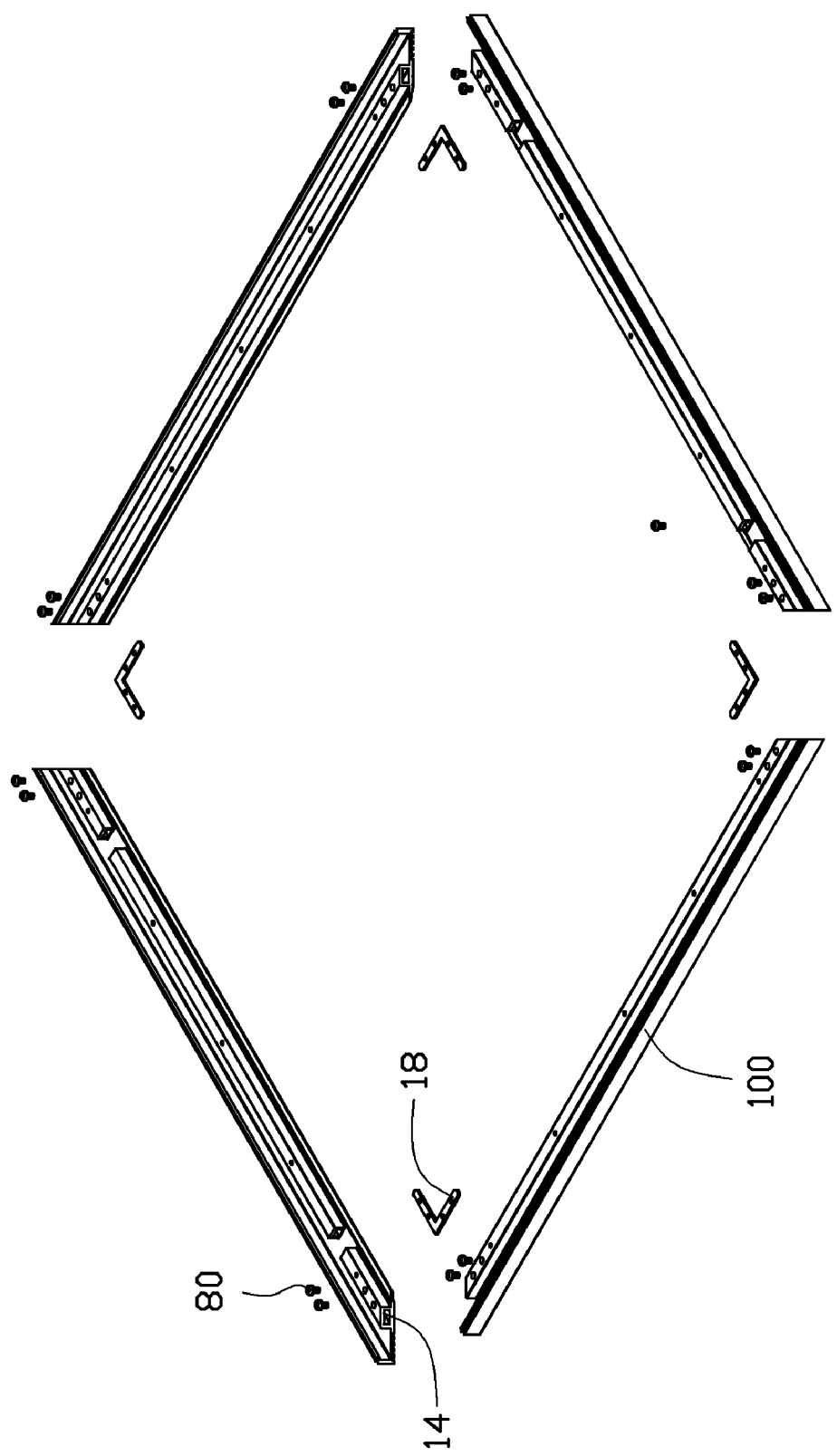
FIG. 5 shows an exploded frame of the LED lamp of FIG. 4.
Figure 6:
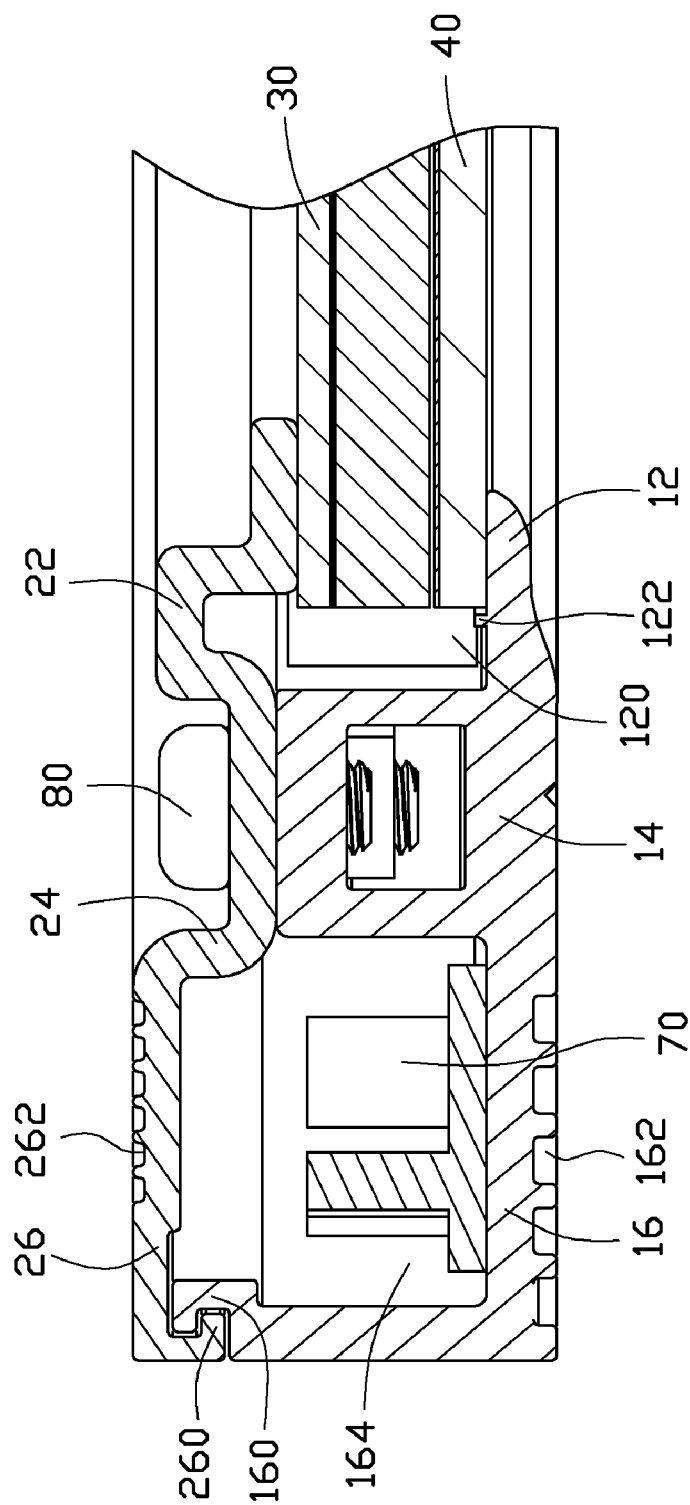
FIG. 6 shows a cross-section of the LED lamp of FIG. 2, taken along line VI-VI thereof.
Figure 7:
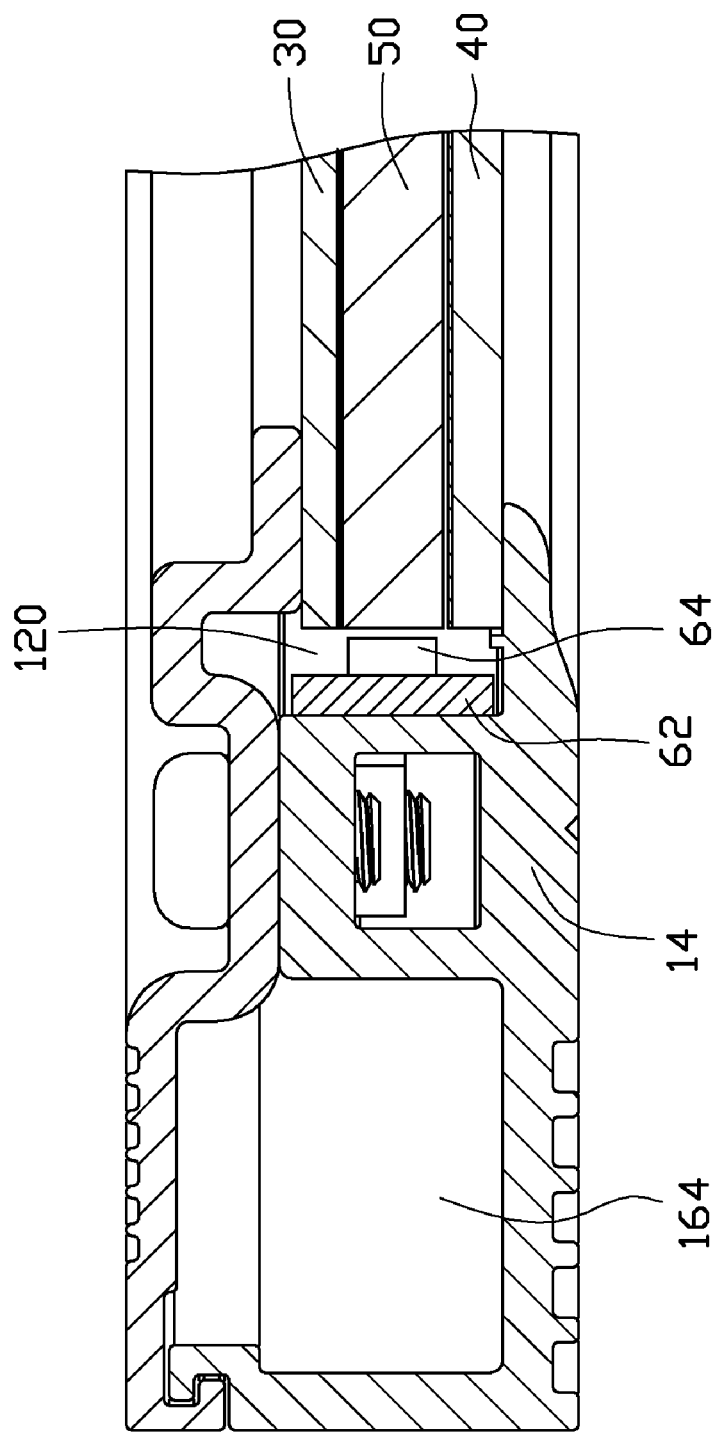
FIG. 7 shows a cross-section of the LED lamp of FIG. 2, taken along line VII-VII thereof.

Also referring to FIGS. 5-7, the frame 10 includes four beams 100 connected to each other by four L-shaped connectors 18 to form a square configuration. Each beam 100 includes a pressing portion 12, a locking portion 16 and a supporting portion 14 interconnecting the pressing portion 12 and the locking portion 16. The supporting portion 14 is upwardly protruded and has a hollow rectangular cross-section. The supporting portion 14 supports the bracket 20 thereon. The pressing portion 12 extends inwardly and horizontally from a bottom of the supporting portion 14. The pressing portion 12 has a cross-section like a tongue for pressing the cover 40 placed thereon upwardly. A small protrusion 122 is formed upwardly from a top of the pressing portion 12, for confining the cover 40 on the right position of the pressing portion 12. The locking portion 16 is extended horizontally and outwardly from a bottom of the supporting portion 14 and then bent upwardly to have an upright sidewall. A free end of the locking portion 16 forms a buckle 160 for locking with the bracket 20. A plurality of slots 162 are defined in a bottom of the locking portion 16 for increasing heat dissipation areas of the frame 10. Each connector 18 has an end inserted into the supporting portion 14 of each beam 100, and an opposite end inserted into the supporting portion 14 of an adjacent beam 100. Screws 80 are brought to extend through the supporting portions 14 and the connectors 18 to fix the four beams 100 together.

The bracket 20 includes four strips 200 each mounted on a corresponding beam 100 of the frame 10. Each strip 200 includes an abutting portion 22, a fastening portion 26 and a mounting portion 24 interconnecting the abutting portion 22 and the fastening portion 26. The mounting portion 24 has a cross-section recessed downwardly to abut against a top of the supporting portion 14 of the beam 100. A screw 80 extends through the mounting portion 24 of the strip 200 into the supporting portion 14 of the beam 100, to thereby secure the bracket 20 on the frame 10. The abutting portion 22 is formed inwardly from a top of the mounting portion 24. The abutting portion 22 has two parallel horizontal parts located at different levels and a vertical part interconnecting the two horizontal parts. A lower one of the two horizontal parts of the abutting portion 22 presses the backplate 30 downwardly. Thus, with pressure produced by the abutting portion 22 and the pressing portion 12, the cover 40, the reflective plate 54, the light guide 50, the diffusion plate 52 and the backplate 30 are tightly sandwiched between the bracket 20 and the frame 10. The abutting portion 22, the mounting portion 24, the pressing portion 12 and the supporting portion 14 cooperatively enclose a first chamber 120 to receive the LED module 60. The fastening portion 26 is formed outwardly and horizontally from the top of the mounting portion 24. A free end of the fastening portion 26 downwardly forms a hook 260 engaging with the buckle 160 of the locking portion 16, thereby reinforcing connection of the bracket 20 and the frame 10. The fastening portion 26, the mounting portion 24, the locking portion 16 and the supporting portion 14 cooperatively enclose a second chamber 164 to receive the driving module therein 70. A plurality of grooves 262 are defined in a top of the fastening portion 26 for increasing heat dissipation areas of the bracket 20.

The two LED modules 60 are received in the two first chambers 120 at two opposite sides of the lamp, and the two driving module 70 are received in the two second chambers 164 at the other two opposite sides of the lamp. Separating the LED modules 60 from the driving modules 70 ensures that heat generated by the driving modules 70 would not significantly affect normal operation of the LED modules 60. Each LED module 60 includes an elongated printed circuit board 62 and multiple LEDs 64 mounted on the printed circuit board 62. The printed circuit board 62 is vertically attached on a lateral of the supporting portion 14 of the frame 10 so that the LEDs 64 are oriented towards the light guide 50.

Figure 8:
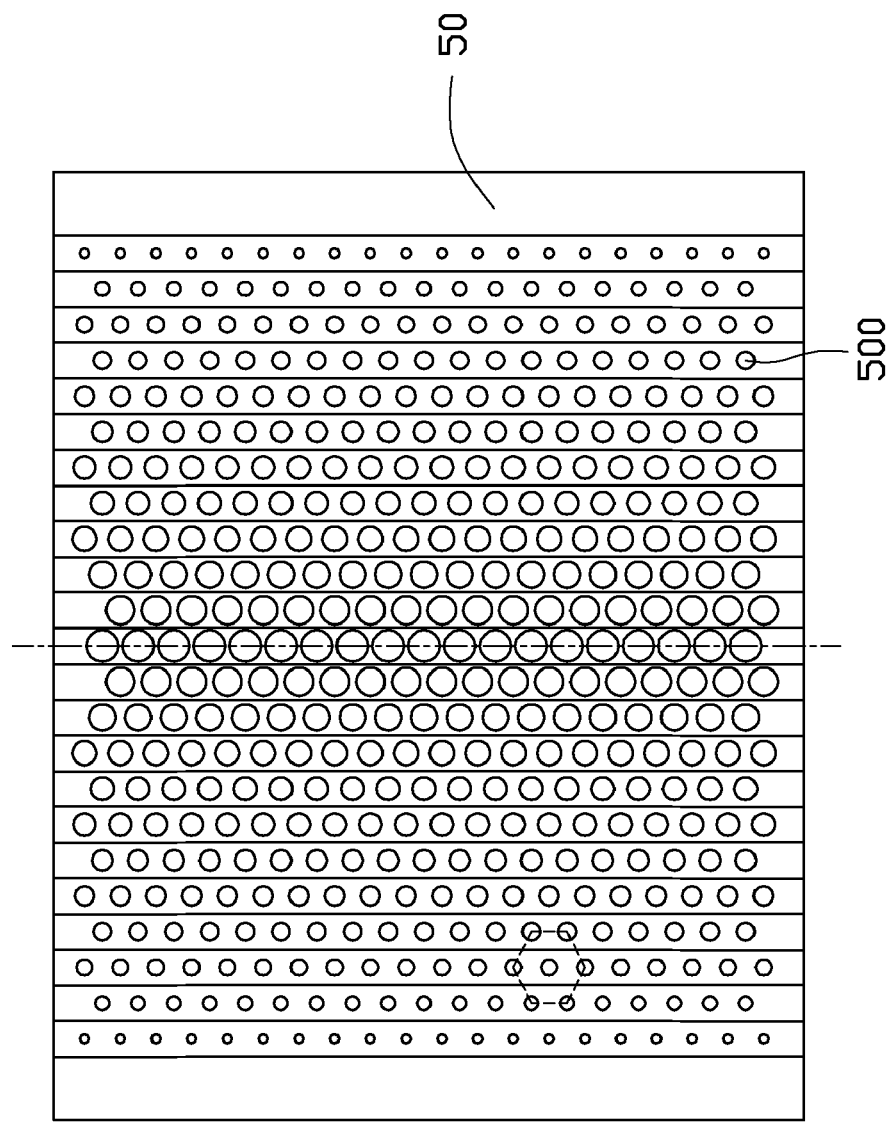
FIG. 8 shows a top of a light guide of the LED lamp of FIG. 4.
Figure 9:
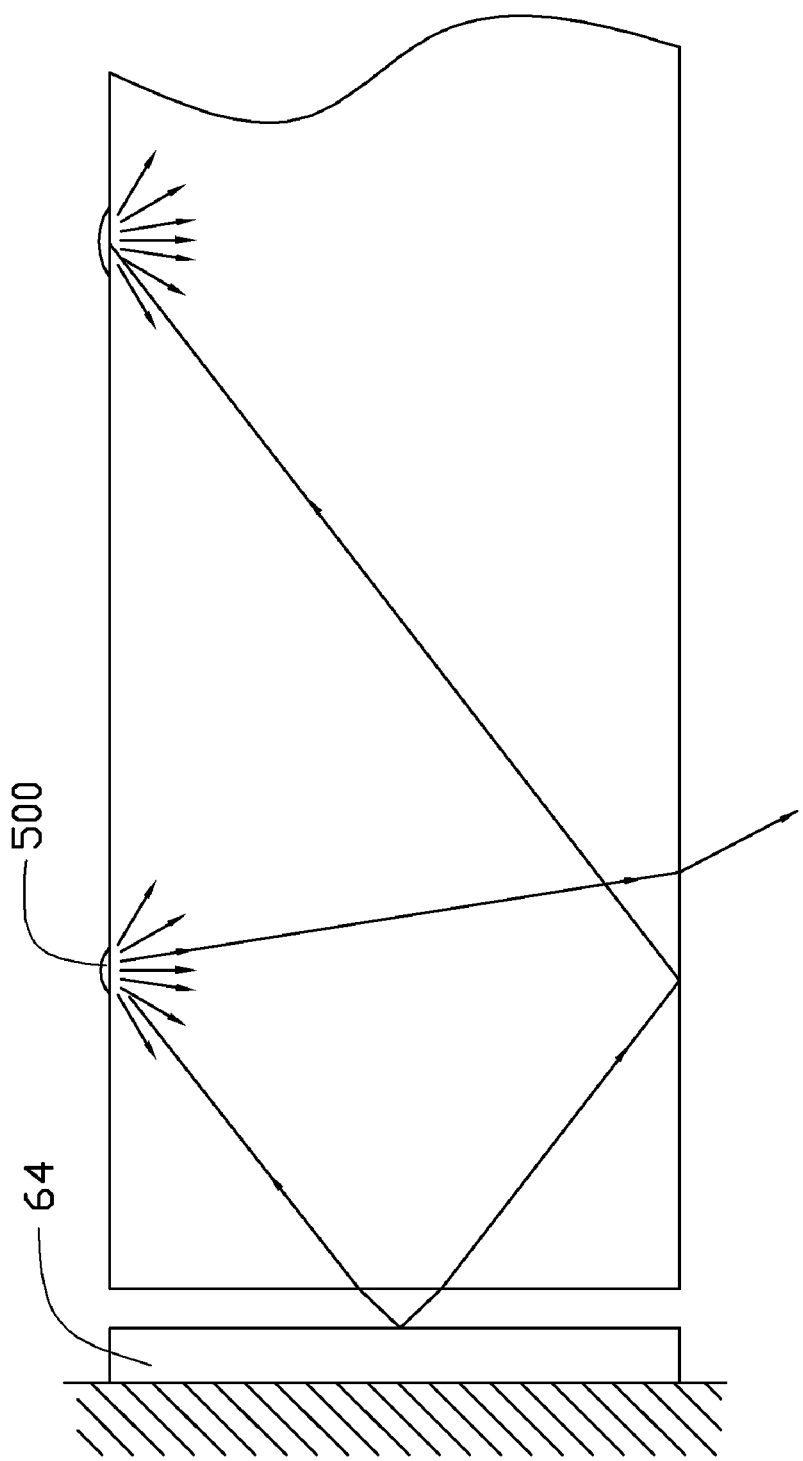
FIG. 9 shows exemplary light pathways in the light guide of the LED lamp of FIG. 1.

Also referring to FIGS. 8-9, the light guide 50 has a thickness similar to a diameter of the LED 64 so that light emitted from the LED 64 could enter the light guide 50 as much as possible. The light guide 50 has a large number of scattering dots 500 formed on a top thereof by printing ink. The scattering dots 500 are protruded from the top of the light guide 50. The scattering dots 500 are arranged in multiple columns along a width of the light guide 50. Each column has a same width, whereby each column occupies a same area. The scattering dots 500 in the same column have identical sizes, and the scattering dots 500 in different columns have the sizes thereof gradually increasing from two opposite sides toward a middle of the light guide 50. The scattering dots 500 on the light guide 50 are symmetrical about a central line of the light guide 50, which is equidistant from the two opposite sides of the light guide 50, as shown in FIG. 8, and extends through centers of the scattering dots 500 in the central column; alternatively, the positioning relation between the central line and the scattering dots 500 can be varied according to actual requirements. For example, the central line may be located between two neighboring middle columns of the scattering dots 500 without extending through the scattering dots 500. The scattering dots 500 in each column are staggered with those in adjacent column(s) and aligned with those in the column(s) which is adjacent to the adjacent column(s). In such arrangement, multiple hexagons (one being shown in broken lines in FIG. 8) can be defined by the scattering dots 500 in three consecutively adjacent columns wherein each hexagon encloses a scattering dot 500 in the middle one of the three adjacent columns. Assuming that each scattering dot 500 has a shape approximate to circle, an area of each scattering dot 500 can be calculated by $(D/2)^2 * \pi$ (D presents a diameter of the scattering dot 500), and a total area of the scattering dots 500 in a selected column is $n*(D/2)^2*\pi$ (n presents the total number of the scattering dots 500 in the selected column). A filling ratio of the scattering dots 500 in the random column can be calculated as follows:

$$K(D)=n*(D/2)^2*\pi/Ls;$$

wherein K(D) presents the filling ratio, and Ls presents the total area of the selected column of the light guide 50.

The value of K(D) gradually increases from 10% to 80% in a direction from the two opposite sides towards the middle of the light guide 50. Furthermore, variation of K(D) is more dramatic at the location near the middle of the light guide 50 than near the two opposite sides of the light guide 50.

Being scattered by the scattering dots 500 of the light guide 50, the light emitted from the LEDs 64 can be uniformly projected out of the lamp. A part of light entering the light guide 50 from the LED 64 would directly refracted out of the light guide 50, based that an incident angle of the light relative to a bottom face of the light guide 50 is less than a critical angle of the light guide 50. Another part of light entering the light guide 50 from the LED 64, would impinge one the scattering dot 500 and then be diffused by the scattering dot 500 oriented towards various directions. A part of the diffused light having an incident angle less than the critical angle of the light guide 50, can directly radiate out of the bottom face of the light guide 50, and remaining diffused light having an incident angle larger than the critical angle, would be totally reflected by the bottom face of the light guide backwardly. Remaining part of light from the LED 64, with an incident angle relative to the bottom face of the guide light 50 larger than the critical angle of the light guide 50, would be directly totally reflected backwardly in the light guide 50. Note that the totally reflected light may be totally reflected in the light guide 50 many times until impinging these scattering dots 500, and then repeat the above process to be refracted out of the bottom face of the light guider 50. Thus, the light emitted from the LEDs 64 are scattered by the scattering dots 500 on light guide 50 evenly before radiating out of the lamp.

Furthermore, in order to prevent the light from leakage from the top of the light guide 50, the reflective plate 52 is placed on the top of the light guide 50. In addition, the diffusion plate 54 placed on the bottom of the light guide 50 further diffuses the light from the light guide 50 more evenly so that the scattering dots 500 are invisible from an outside of the lamp.

The lamp of the present disclosure can have a small thickness and volume by use of the light guide 50, thereby meeting various illumination requirements. Furthermore, the lamp is more compact compared with the conventional lamps due to the driving modules 70 being received within the frame 10.

It is believed that the present disclosure and its advantages will be understood from the foregoing description, and it will be apparent that various changes may be made thereto without departing from the spirit and scope of the present disclosure or sacrificing all of its material advantages, the examples hereinbefore described merely being preferred or exemplary embodiments.

What is claimed is:

1. An LED (light emitting diode) lamp comprising:
an enclosure;
a backplate received in the enclosure;
an LED module received in the enclosure, the LED module comprising a printed circuit board and multiple LEDs mounted on the printed circuit board;
a light guide received in the enclosure; and
a cover mounted in the enclosure;
wherein the light guide is sandwiched between the cover and the backplate;
wherein the LEDs are oriented towards a lateral side of the light guide;
wherein the light guide has a plurality of scattering dots formed on a back side thereof facing the backplate;
wherein the enclosure comprises multiple beams connected to each other to form a hollow frame and multiple strips connected to each other to form a hollow bracket;
wherein the beams are connected to the strips to define a first chamber and a second chamber separated from the first chamber, the first chamber being located adjacent to the light guide and the second chamber being located adjacent to an outmost periphery of the enclosure;
wherein a driving module is received in the second chamber, the LED module is received in the first chamber, and the driving module and the LED module are located in different beams of the enclosure; and
wherein an outer portion of each strip forms a hook and an outer portion of each beam forms a buckle, the hook being locked with the buckle to fix the each strip to the each beam.

2. The LED lamp as claimed in claim 1, wherein the scattering dots are arranged in a plurality of columns on the light guide along a width of the light guide, each column occupying a same area.

3. The LED lamp as claimed in claim 2, wherein the scattering dots in a same column have the same size with each other.

4. The LED lamp as claimed in claim 3, wherein the sizes of the scattering dots in different columns gradually increase from two opposite sides towards a middle of the light guide.

5. The LED lamp as claimed in claim 4, wherein the scattering dots have a filling ratio ranging between 10% and 80%, the filling ratio being presented by formula $K(D)=n*(D/2)^2*\pi/Ls$, where $K(D)$ presents the filling ratio, n presents the total number of the scattering dots in each column, D presents a diameter of each scattering dot in the each column, and Ls presents the area of the each column.

6. The LED lamp as claimed in claim 5, wherein the filling ratio is varied more dramatically at a location near the middle than near the two opposite sides of the light guide.

7. The LED lamp as claimed in claim 1, wherein a hexagon is defined by the scattering dots in three consecutively adjacent columns which encloses a scattering dot in a middle one of the three columns.

8. The LED lamp as claimed in claim 1, wherein the backplate, the light guide and the cover are sandwiched between inner portions of the beams and the strips.

9. The LED lamp as claimed in claim 1, wherein middle portions of the beams and the strips are secured to each other by screws.

10. The LED lamp as claimed in claim 1 further comprising multiple L-shaped connectors, wherein every two adjacent beams are connected to each other by a corresponding connector.

11. The LED lamp as claimed in claim 1 further comprising a diffusion plate sandwiched between the light guide and the cover.

12. The LED lamp as claimed in claim 1 further comprising a reflective plate sandwiched between the backplate and the light guide.

13. The LED lamp as claimed in claim 1, wherein the LED lamp has a rectangular configuration.

* * * * *